United States Patent
Kim et al.

(10) Patent No.: US 9,204,479 B2
(45) Date of Patent: Dec. 1, 2015

(54) METHOD OF TRANSMITTING AND RECEIVING DATA IN TALK-AROUND DIRECT COMMUNICATION NETWORK

(71) Applicant: Electronics and Telecommunications Research Institute, Daejeon (KR)

(72) Inventors: Sung Kyung Kim, Daejeon (KR); Soojung Jung, Daejeon (KR); Seungkwon Cho, Gyeonggi-do (KR); Hyung Jin Kim, Daejeon (KR); Chanho Yoon, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 134 days.

(21) Appl. No.: 14/023,862

(22) Filed: Sep. 11, 2013

(65) Prior Publication Data
US 2014/0071917 A1 Mar. 13, 2014

(30) Foreign Application Priority Data

Sep. 11, 2012 (KR) .................. 10-2012-0100271
Jan. 28, 2013 (KR) .................. 10-2013-0009078
Sep. 10, 2013 (KR) .................. 10-2013-0108719

(51) Int. Cl.
*H04W 76/02* (2009.01)
*H04L 5/00* (2006.01)
*H04W 4/00* (2009.01)

(52) U.S. Cl.
CPC ........... *H04W 76/023* (2013.01); *H04L 5/0037* (2013.01); *H04L 5/0094* (2013.01); *H04L 5/0007* (2013.01); *H04L 5/0032* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 2006/0165035 A1* | 7/2006 | Chandra et al. | 370/329 |
| 2012/0039308 A1* | 2/2012 | Kim et al. | 370/336 |
| 2012/0224546 A1* | 9/2012 | Chang et al. | 370/329 |
| 2012/0294245 A1* | 11/2012 | Chang et al. | 370/329 |
| 2013/0029675 A1* | 1/2013 | Kwon et al. | 455/450 |
| 2014/0056248 A1* | 2/2014 | Wang et al. | 370/329 |
| 2014/0335906 A1* | 11/2014 | Kim et al. | 455/509 |

FOREIGN PATENT DOCUMENTS

KR 10-2012-0074247 A 7/2012

* cited by examiner

*Primary Examiner* — Min Jung
(74) *Attorney, Agent, or Firm* — Rabin & Berdo, P.C.

(57) ABSTRACT

A method in which a transmitting terminal included in an talk-around direct communication (TDC) network transmits data includes: determining a data frame for transmitting the data; requesting to reserve a data transmission segment included in the data frame through a transmission request segment included in the data frame; receiving a response signal transmitted in a transmission response segment included in the data frame; and analyzing the response signal and transmitting the data through the data transmission segment.

19 Claims, 21 Drawing Sheets

METHOD OF TRANSMITTING AND RECEIVING DATA IN TALK-AROUND DIRECT COMMUNICATION NETWORK

CROSS-REFERENCE TO RELATED APPLICATION

This application claims priority to and the benefit of Korean Patent Application Nos. 10-2012-0100271, 10-2013-0009078, and 10-2013-0108719 filed in the Korean Intellectual Property Office on Sep. 11, 2012, Jan. 28, 2013, and Sep. 10, 2013, the entire contents of which are incorporated herein by reference.

BACKGROUND OF THE INVENTION (a) Field of the Invention

The present invention relates to a method for each terminal included in an talk-around direct communication network to transmit and receive data using a data frame.

(b) Description of the Related Art

Conventional distributed resource allocation may use carrier sense multiple access with collision detection (CSMA/CD) defined by IEEE 802.11. In the CSMA/CD protocol, if the channel is idle, each terminal requests resources through request to send/clear to send (RTS/CTS) messages, and upon receiving a response without a collision, occupies radio resources and transmits data. In this case, even when two or more terminals simultaneously transmit an RTS message, if the opposing terminal does not detect this message, it cannot transmit a CTS message.

In distributed resource allocation, radio segments may be allocated in a way that is suitable for packet-based data transmission. The radio segments suitable for packet-based data transmission are used to transmit one packet or data slots.

The above resource allocation method is not appropriate for supporting the QoS (quality of service) of voice or large file transfer and the QoS of interactive services.

SUMMARY OF THE INVENTION

The present invention has been made in an effort to provide a distributed resource allocation method which is suitable for direct communication services with various QoS demands such as the QoS of voice or large file transfer or the QoS of interactive service.

According to an exemplary embodiment of the present invention, a method in which a transmitting terminal included in a talk-around direct communication (TDC) network transmits data is provided. The transmitting method includes determining a data frame for transmitting the data, requesting to reserve a data transmission segment included in the data frame through a transmission request segment included in the data frame, receiving a response signal transmitted in a transmission response segment included in the data frame, and analyzing the response signal and transmitting the data through the data transmission segment According to another exemplary embodiment of the present invention, a method in which a receiving terminal included in an talk-around direct communication (TDC) network receives data, the receiving method includes receiving, through a transmission request segment included in a data frame, a request signal requesting to reserve a data transmission segment included in the data frame from at least one transmitting terminal, distinguishing the request signal by an allocation type (AT) area and a scheduling priority (SP) area and determining a transmitting terminal to transmit a response signal, among the at least one transmitting terminal, transmitting the response signal to the determined transmitting terminal in a transmission response segment included in the data frame, and receiving the data transmitted in the data transmission segment by the determined transmitting terminal.

DETAILED DESCRIPTION OF THE EMBODIMENTS

Figure 1:
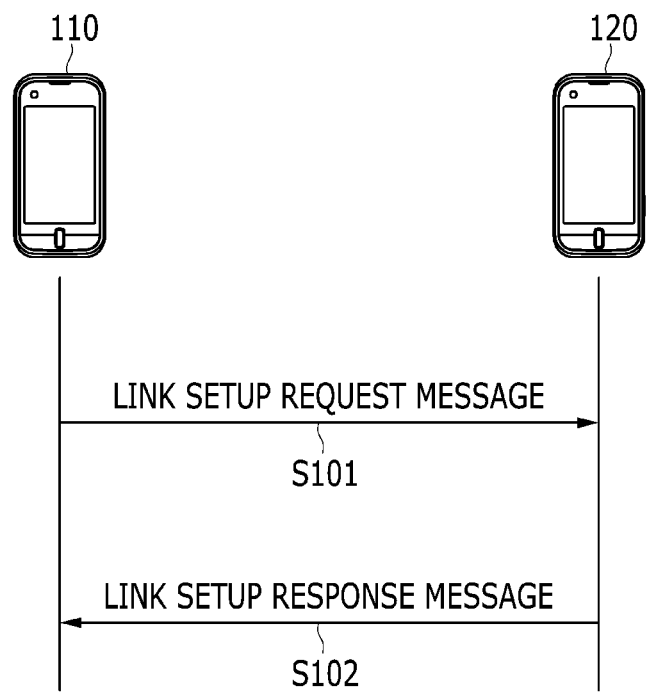
FIG. 1 is a flowchart showing a process of setting up a link between terminals according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, a mobile station (MS) may designate a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the MT, the MS, the AMS, the HR-MS, the SS, the PSS, the AT, the UE, etc.

In the specification, unless explicitly described to the contrary, the word "comprise" and variations such as "comprises" or "comprising", will be understood to imply the inclusion of stated elements but not the exclusion of any other elements. In addition, the terms, such as " . . . unit", " . . . er/or", "module", or "block", described in the specification mean units for processing at least one function and operation and can be implemented by hardware components or software components and combinations thereof.

FIG. 1 is a flowchart showing a process of setting up a link between terminals according to an exemplary embodiment of the present invention.

Referring to FIG. 1, a terminal may perform a link setup procedure upon identifying a terminal with which it will attempt to communicate. The link setup procedure link is initiated when the terminal (transmitting terminal) 110 wanting to transmit data transmits a link setup request message.

The terminal (receiving terminal) 120 that has received the link setup request message transmits a link setup response message to the transmitting terminal.

The link setup request message includes the addresses of the transmitting terminal 110 and receiving terminal 120 and a link identifier (Link ID) between the two terminals. By link setup request/response messaging, the two terminals may conduct QoS parameter and basic function negotiations related to a data service transmitted via this link.

A terminal capable of functioning as a base station or controller may relay the link setup procedure between terminals. Te link identifier may be assigned from the terminal functioning as a base station or controller.

Figure 2:
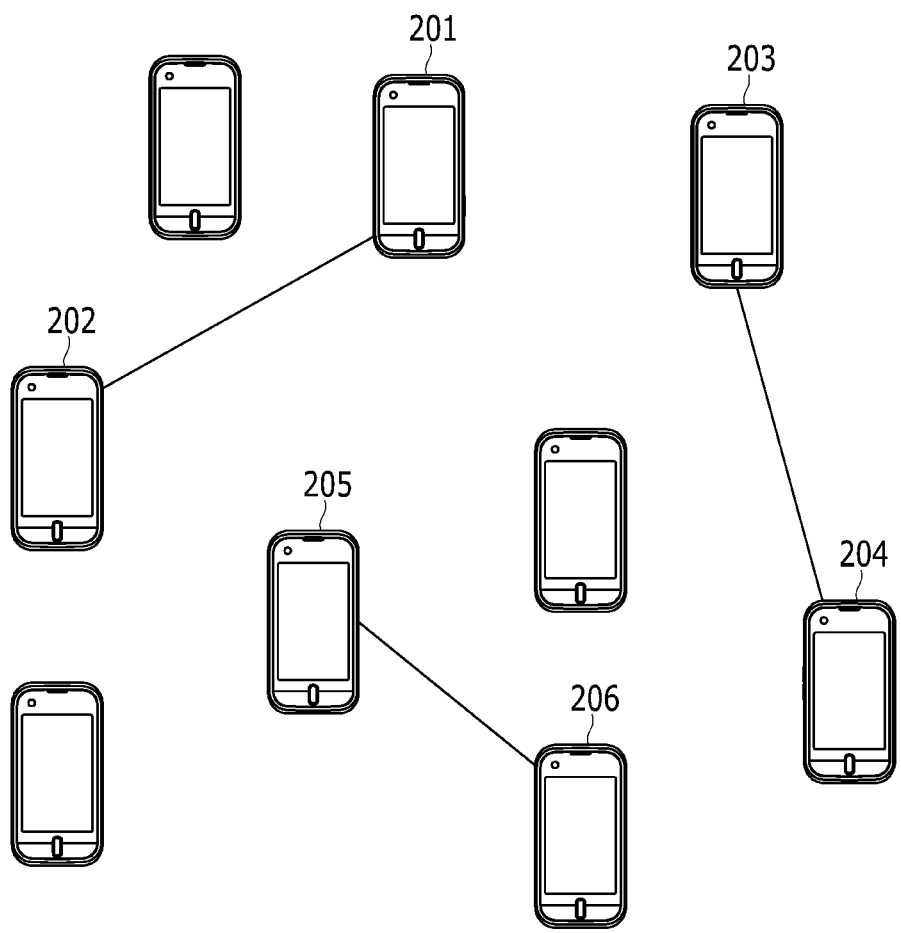
FIG. 2 is a view showing a plurality of terminals among which links are set up through the link setup procedure of FIG. 1.

FIG. 2 is a view showing a plurality of terminals among which links are set up through the link setup procedure of FIG. 1.

Referring to FIG. 2, a link is set up between Terminal 1 201 and Terminal 2 202, a link is set up between Terminal 3 203 and Terminal 204, and a link is set up between Terminal 5 205 and Terminal 6 206.

Figure 3:
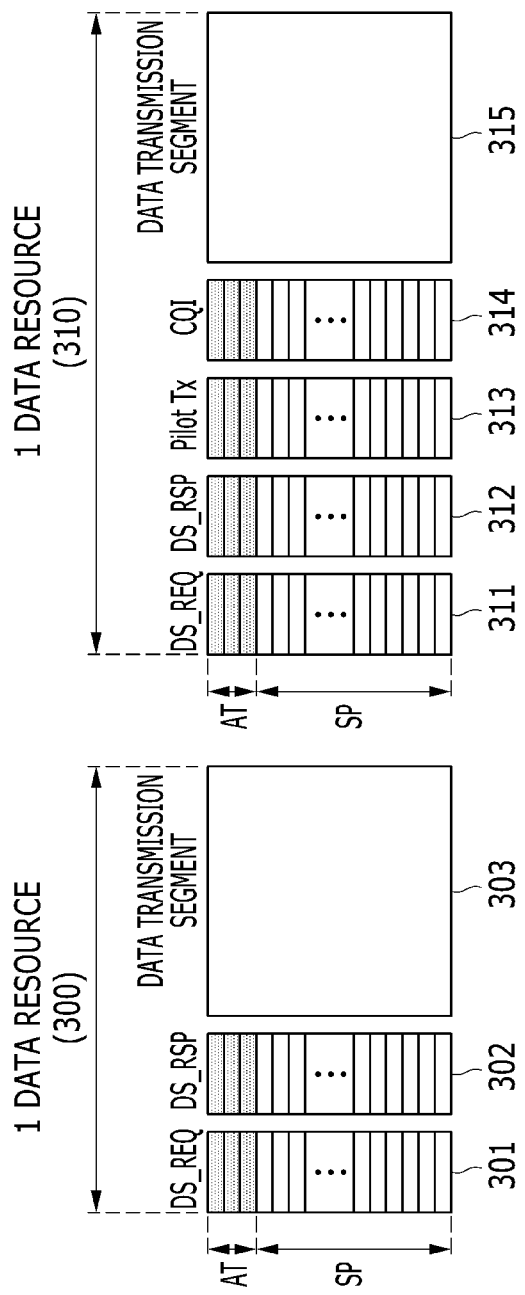
FIG. 3 is a view showing a data resource for transmitting data between two terminals according to an exemplary embodiment of the present invention.

FIG. 3 is a view showing a data resource for transmitting data between two terminals according to an exemplary embodiment of the present invention.

When a link between a transmitting terminal and a receiving terminal has been set up, the transmitting terminal performs a procedure for data transmission. In order for the transmitting terminal to transmit data to the receiving terminal, a transmission resource may be acquired through distributed scheduling.

Assuming that rate scheduling is not performed, a data resource 300 according to one exemplary embodiment of the present invention may include a distributed scheduling request (DS_REQ) segment 301, a distributed scheduling response (DS_RSP) segment 302, and a data transmission segment 303. Alternatively, assuming that rate scheduling is performed, the data resource 310 may include distributed scheduling request/response (DS_REQ/DS-RSP) segments 311 and 312, a pilot transmission segment 313, a channel quality information (CQI) segment 314, and a data transmission segment 315.

Referring to FIG. 3, transmission signals of the DS_REQ segment 301 and the DS_RSP segment 302 are determined depending on the value of a scheduling code (SC). In this case, SC may identify a link set up between terminals, and determine scheduling priority (SP) and allocation type (AT). That is, a terminal may distinguish requests from a plurality of terminals and identify the priorities and allocation types of requests, by using signals received in the DS_REQ segment 301 and the DS_RSP segment 302. In this case, each terminal may identify, through AT, which terminal is occupying which resource, the occupation period, and whether the occupation continues or not.

The ATs for the DS_REQ segment 301 or DS_RSP segment 302 include base station allocation (BA), periodic allocation (PA), and continuous allocation (CA). BA has the highest priority. PA indicates that the resource is periodically used. CA indicates that the resource is continuously used. Because CA has a lower priority than BA and PA, it concedes the resource if BA or PA occurs in the middle of CA. Any allocation type corresponding to neither BA, PA, nor CA is normal allocation (None), which indicates that one data resource is allocated for one-time use. Priorities among ATs are in the order of BA>PA>CA>None.

SP may be calculated based on the functions of a source (transmitting) terminal identifier, an TDC link identifier, a time index, a data QoS index, and a resource load index.

$$SP=\text{function(source terminal ID,Link ID,time index, urgent index,congestion index)} \quad \text{(Equation 1)}$$

The range of SP may be restricted to the area other than the AT area within the coverage of SC, and SP may indicate scheduling priority. For example, the lower the SP value, the higher priority it has. Also, when a link is set up between two terminals, scheduling priority may be changed depending on time index (e.g., frame index) in order to avoid continuous collision of SPs. Two terminals with a link set up between them may share the same urgent index value and the same congestion index value. For example, each terminal may send and receive the urgent index and the congestion index in a link setup segment, traffic connection setup segment, or data transmission segment.

The urgent index is an index related to the maximum transmission delay of data to be transmitted. The higher the QoS of data service against transmission delay, the higher the urgent index. The congestion index is an index which represents the frequency of use of distributed resources or the frequency of requests for distributed resources. The larger the load of distributed resources, the higher the congestion index value The urgent index and the congestion index may be used to determine an SP window (the range from the maximum to minimum values of scheduling priority allowed for the current link).

Figure 4:
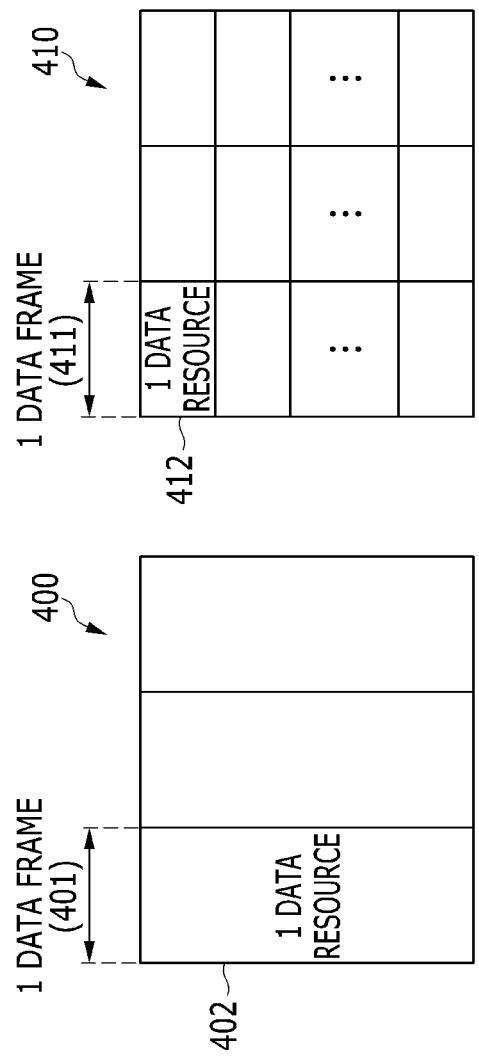
FIG. 4 is a view showing a data resource divided according to a frequency division method according to an exemplary embodiment of the present invention.

FIG. 4 is a view showing a data resource divided according to a frequency division method according to an exemplary embodiment of the present invention.

Each data frame 401 and 411 may conform to orthogonal frequency division multiplexing (OFDM) or orthogonal frequency division multiple access (OFDMA). That is, each terminal may use 400 the entire parts of one data frame 401 as a data resource 402 according to OFDM, or use (410) one 412 of a plurality of data resources included in one data frame 411 according to OFDMA.

Figure 5:
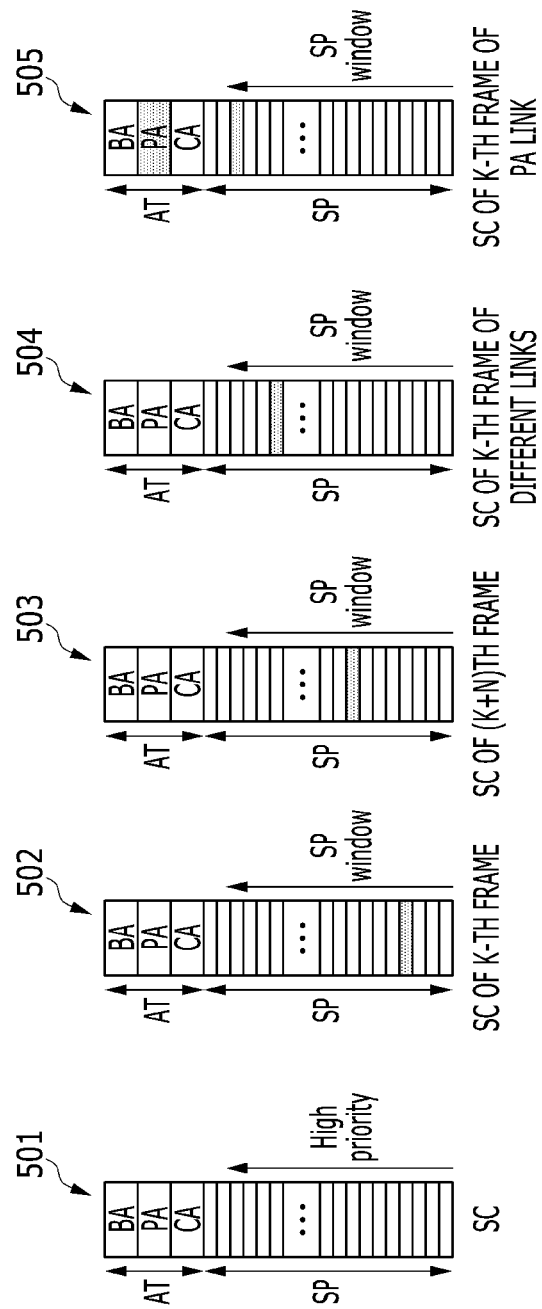
FIG. 5 is a view showing a scheduling code according to an exemplary embodiment of the present invention.

FIG. 5 is a view showing a scheduling code according to an exemplary embodiment of the present invention.

Distributed scheduling for TDC requires resource allocation to increase the utilization of radio resources and support the QoS of direct communication service. That is, according to an exemplary embodiment of the present invention, SP and AT are defined for a media access control (MAC) layer of each link in order for a terminal performing TDC to increase scheduling efficiency and allocate and reserve radio resources in consideration of priority. SP is transmitted in the distributed scheduling segments (DS_REQ and DS_RSP) for data transmission. That is, a number of terminals performing TDC communication can simultaneously request resources for data transmission. Through SP, each terminal may distinguish resource requests and identify the priorities and allocation types of requests. In this case, it is assumed that signals transmitted in the distributed scheduling segments do not collide.

When a link has been set up between two terminals wanting to communicate, the two terminals share the link identifier of the setup link. At this time, the link identifier is set in a way that avoids interference (in a way that is orthogonal), the transmitting and receiving terminals can get information from each other even if they do not give their address. The SP of the two terminals can be calculated using the functions of the link identifier and time index (e.g., frame index). In this case, the scheduling priority may be changed depending on the time index so as to balance the fairness between the two terminals.

Referring to FIG. 5, a scheduling code 501 includes an AT area and an SP area. The AT area includes resources corresponding to BA, PA, and CA, and the terminals identify allocation types through signals transmitted using each resource. The SP area consists of a plurality of radio resources, and may be divided into the number of SPs allowed in a data frame.

Once the scheduling priority for this link is determined, each terminal transmits signals by using the resource areas according to the determined priority. If the two terminals have the same (priority) value at the same point of time, and the SP area is sufficiently larger than the number of activated links, the two terminals may transmit request/response signals without collisions with other links.

Referring to FIG. 5, if the frame the terminal uses is changed from K 502 to (K+n) 503, the resources of the SP area are also changed. Also, the resources of the SP area are different for different links 504. In addition, for periodic resource allocation 505, the resource corresponding to PA in AT and one of the resources of the SP area are used to transmit a signal.

Figure 6:
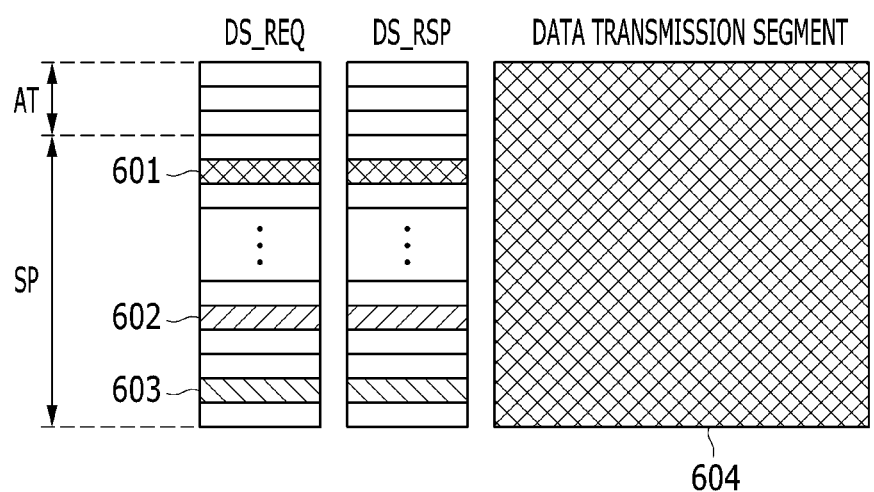
FIG. 6 is a view showing a data frame for general allocation according to an exemplary embodiment of the present invention.

FIG. 6 is a view showing a data frame for general allocation according to an exemplary embodiment of the present invention.

Referring to FIG. 6, in the DS_REQ segment, no signal (BA, PA, or CA request signal) is transmitted through the AT area, and a first signal 601, a second signal 602, and a third signal 603 are respectively transmitted in the three parts of the SP area. In the DS_RSP segment, the receiving terminal transmits a response signal to the transmitting terminal that has transmitted the signals.

In the exemplary embodiment of the present invention, the parts of the SP area closer to the AT area have higher priority. As such, the first signal 601 has the highest priority. Accordingly, the terminal that has transmitted the first signal 601 may transmit data by using a data transmission segment 604.

Figure 7:
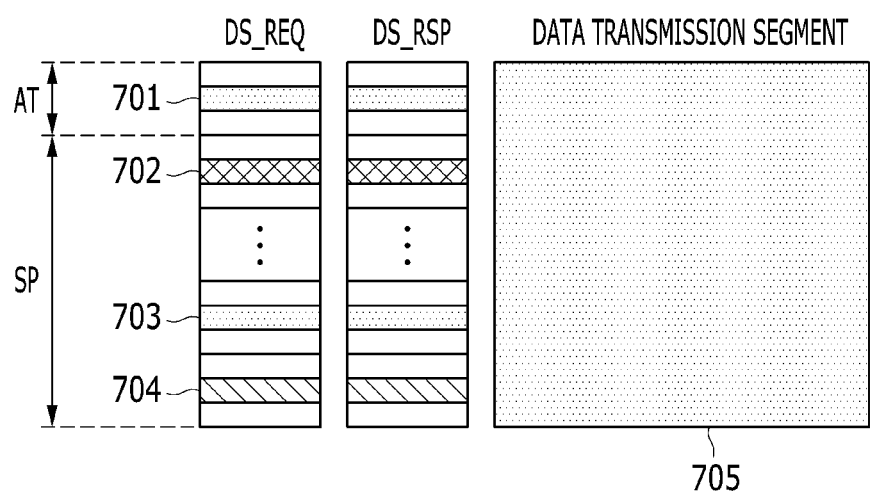
FIG. 7 is a view showing a data frame for periodic allocation according to an exemplary embodiment of the present invention.

FIG. 7 is a view showing a data frame for periodic allocation according to an exemplary embodiment of the present invention.

Referring to FIG. 7, since this data frame is for periodic allocation, signals are transmitted in the PA area 701 of the AT area and the three parts (first to third signals) 702, 703, and 704 of the SP area. At this time, a PA-requesting terminal transmits signals (a PA request signal and a second signal) in the PA area and the SP area, respectively, and the receiving terminal transmits a signal in the DS_RSP segment by using the same radio resource as that used to transmit the second signal. That is, the receiving terminal transmits a signal to the PA-requesting terminal in the DS_RSP segment by using the same radio resource as the second signal 703, because the PA-requesting terminal has transmitted the second signal 703 although the first signal 702, among the signals received in the SP area of the DS_REQ segment, has higher priority than the other signals. Also, the PA-requesting terminal may transmit data in a subsequent data transmission segment 705.

Figure 8:
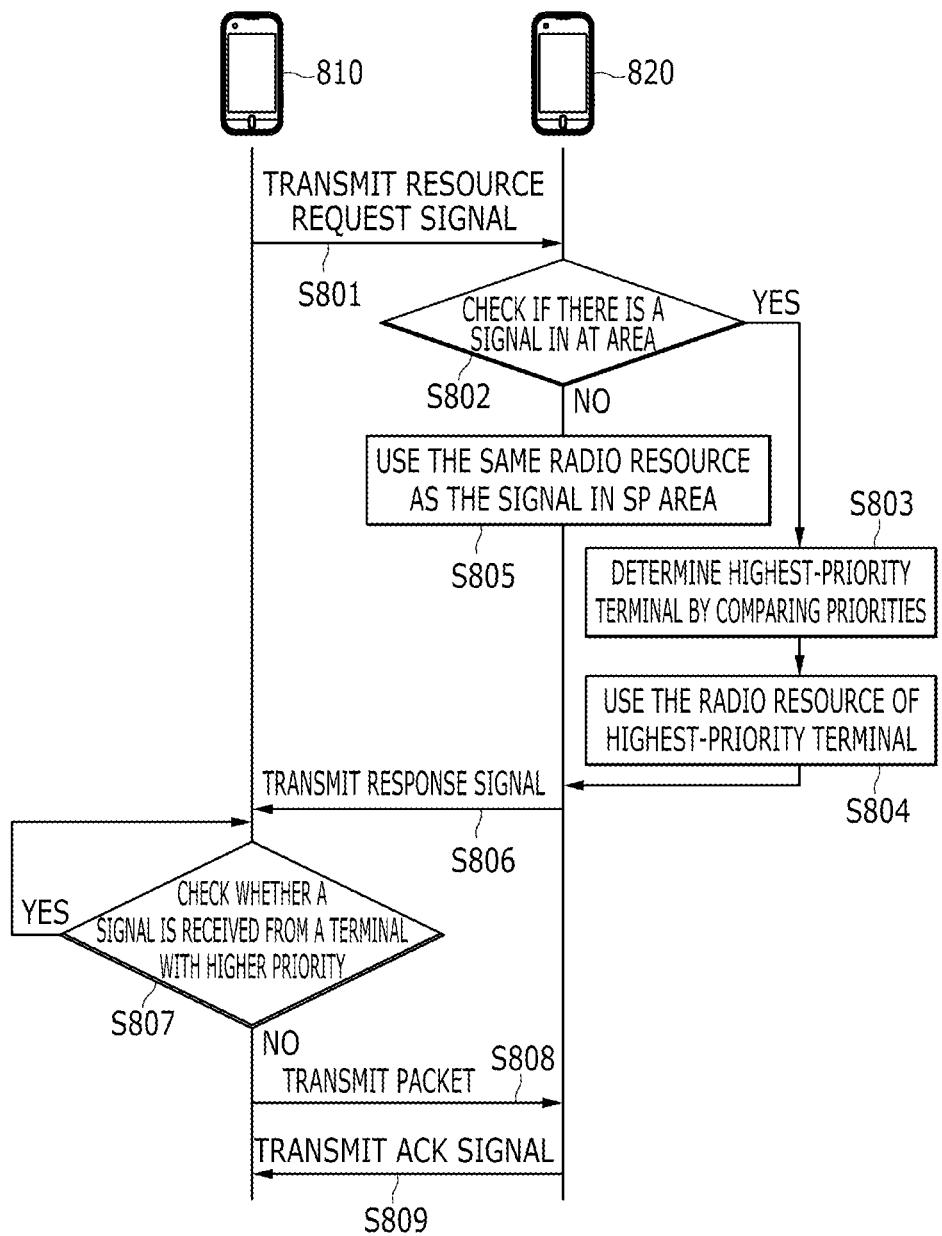
FIG. 8 is a flowchart showing a distributed resource allocation procedure according to an exemplary embodiment of the present invention.

FIG. 8 is a flowchart showing a distributed resource allocation procedure according to an exemplary embodiment of the present invention.

Referring to FIG. 8, a data resource-requesting terminal (which will be hereinafter referred to as 'transmitting terminal'), among a plurality of terminals connected via a plurality of links, transmits a resource request signal in the DS_REQ segment by using the resource corresponding to its SC (S801). At this time, the transmitting terminal may request PA or CA by using the AT area included in the DS_REQ segment.

Afterwards, the terminal (hereinafter, referred to as 'receiving terminal') that has received the resource request signal in the DS_REQ segment checks if there is a signal received in the AT area (S802). If there is a signal received in the AT area, the transmitting terminal that has requested the allocation type of the highest priority is determined by comparing priorities for the AT area (S803). Next, a response signal is transmitted in the DS_RSP segment by using the same radio resource as used by the determined transmitting terminal (S804 and S806). For example, if the receiving terminal has received a PA request and a CA request in the AT area, the receiving terminal transmits a response signal in the DS_RSP segment by using the same radio resource as used by the PA-requesting terminal because the PA request has higher priority.

On the other hand, if there is no signal received in the AT area, the receiving terminal transmits a signal in the DS_RSP segment (S806) by using the same radio resource as used for the signal received in the DS_REQ segment (S805).

Afterwards, upon receiving the signal that the receiving terminal has transmitted in the DS_RSP segment, the transmitting terminal checks whether a signal is received from a terminal with higher priority than its own (S807), and if not, transmits a packet in the data transmission segment (S808).

Next, upon receiving the packet transmitted in the data transmission segment, the receiving terminal broadcasts an ACK signal by using the radio resources of the DS_RSP segment of the next data frame (S809).

In FIGS. 9 to 12 shown below, a resource allocation method according to one exemplary embodiment of the present invention will be explained using five data frame arranged consecutively in order of time.

Figure 9:
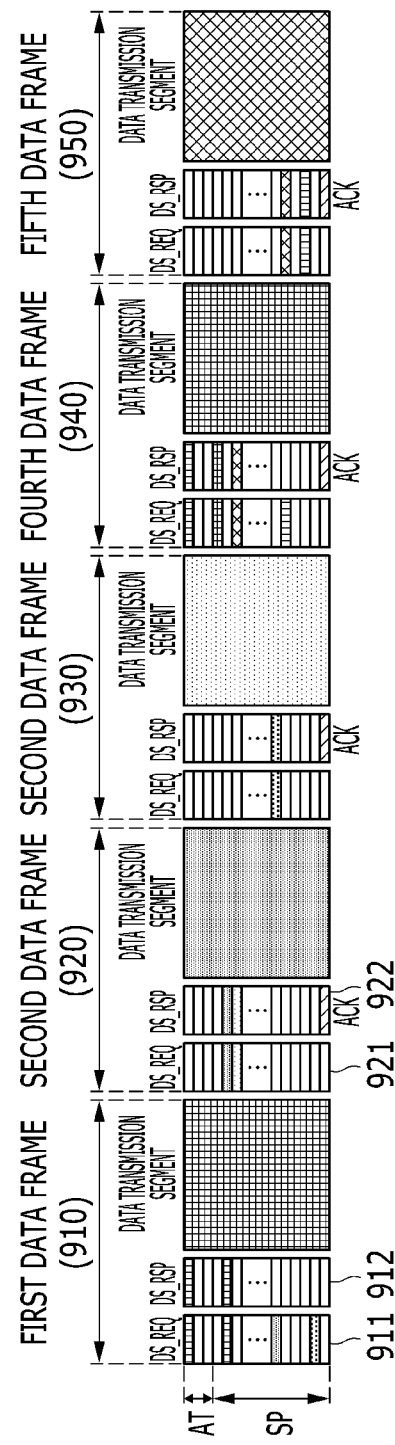
FIG. 9 is a time-sequence diagram showing data frames for allocation to the base station according to an exemplary embodiment of the present invention.

FIG. 9 is a time-sequence diagram showing data frames for base station allocation according to an exemplary embodiment of the present invention.

Referring to FIG. 9, the base station sends a request for base station allocation in the DS_REQ 911 of the first data frame 910, and selects one of the resources of the SP area to transmit a signal. At this time, other terminals also transmit signals by using the resources of the SP area.

As a BA request has been received in the AT area of the DS_REQ segment, the receiving terminal responds only to a signal for the BA request in the DS_RSP segment 912, and ignores the signals transmitted from other terminals.

Afterwards, the base station relays a packet by using the data transmission segment of the first data frame 910. Then, the receiving terminal transmits ACK of packet transmission in the first data frame to the base station through the DS_RSP segment 922 of the second data frame 920.

Next, since no allocation type is requested in the AT area in the second data frame 920, third data frame 930, and fifth data frame 950, a plurality of terminals that have requested resources may occupy the data transmission segment and transmit a packet according to a general allocation method.

Figure 10:
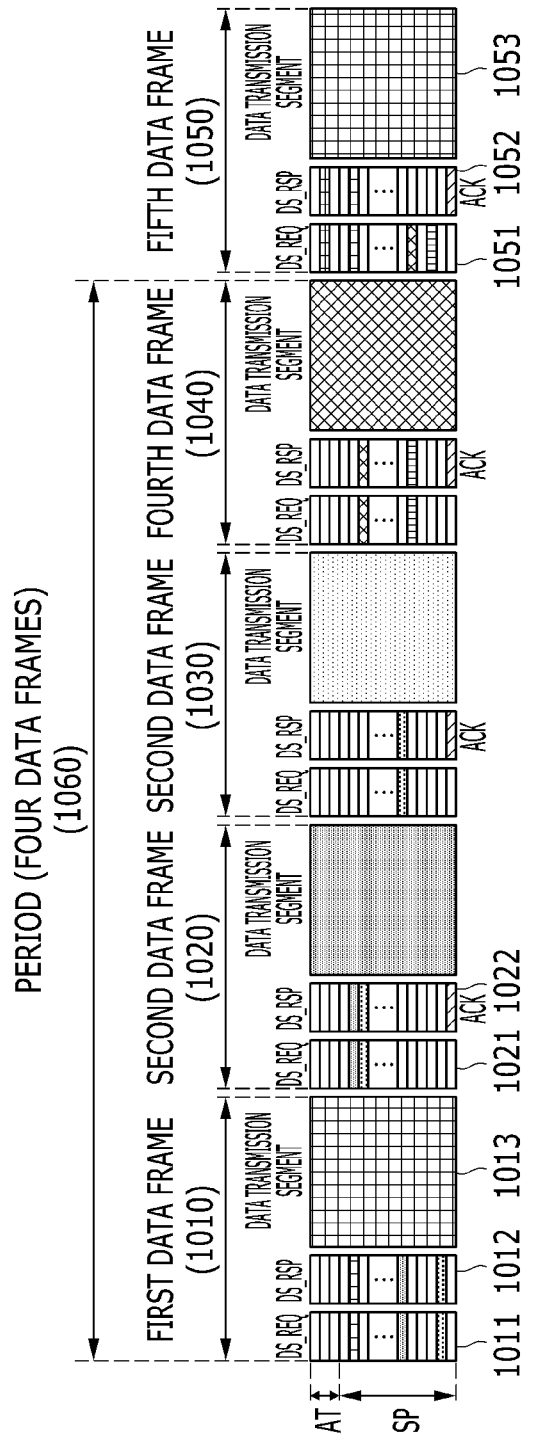
FIG. 10 is a time-sequence diagram showing data frames for periodic allocation according to an exemplary embodiment of the present invention.

FIG. 10 is a time-sequence diagram showing data frames for periodic allocation according to an exemplary embodiment of the present invention.

Referring to FIG. 10, if it is determined that the first terminal that will use the data transmission section according to the general allocation method needs to periodically transmit a packet, the first terminal requests PA in the data transmission segment 1013 of the first data frame 1010. That is, the PA-requesting terminal sends a request for periodic resource allocation through the data transmission segment 1013. The request message may contain the occupation period of the data transmission segment, and the period 1060 may be indicated by the number of data frames.

Afterwards, the receiving terminal that has transmitted an ACK signal to the PA-requesting terminal in the DS_RSP segment 1022 of the second data frame 1020 is aware that PA has been requested, and allocates the data transmission segment 1053 of the fifth data frame 1050 to the first terminal. At this time, if a PA signal is received from the first terminal in the AT area of the DS_REQ 1051, request signals received from other terminals are ignored, and a response signal is transmitted to the first terminal in the AT and ST areas of the DS_RSP 1052.

In FIG. 10, the PA-requesting terminal sets the period to four frames, and the PA-requesting terminal that has requested PA in the data transmission segment 1014 of the first data frame 1010 can later occupy the data transmission segment 1052 of the fifth data frame 1050 as well.

Figure 11:
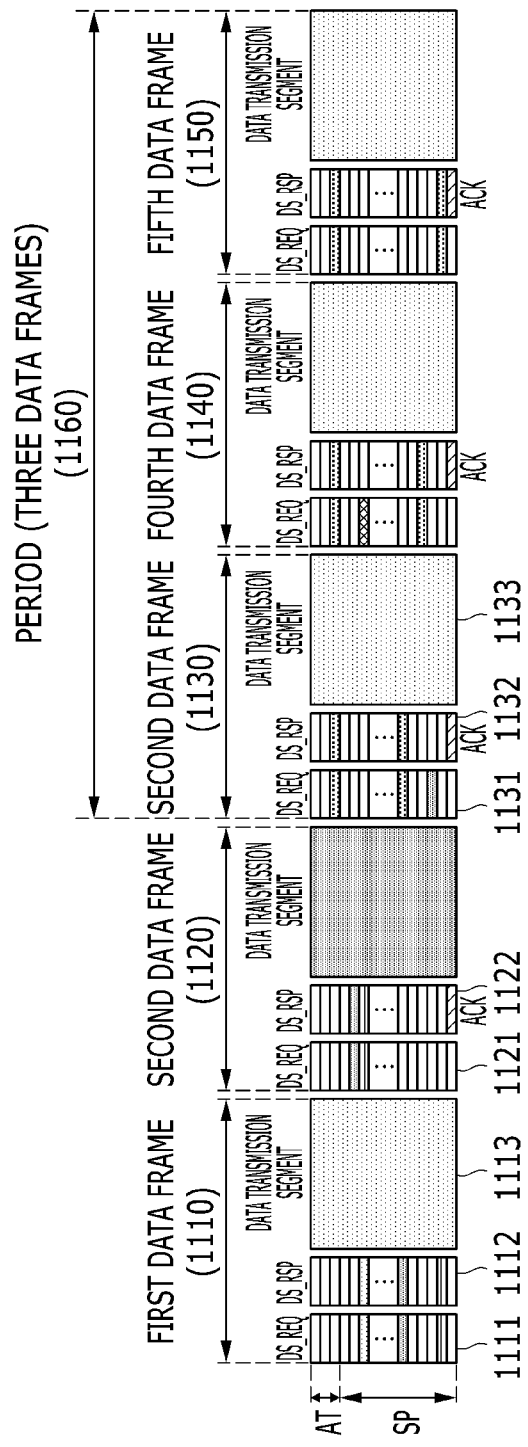
FIG. 11 is a time-sequence diagram showing data frame for continuous allocation according to an exemplary embodiment of the present invention.

FIG. 11 is a time-sequence diagram showing data frame for continuous allocation according to an exemplary embodiment of the present invention.

Referring to FIG. 11, if it is determined that the second terminal that will use the data transmission section according to the general allocation method needs to continuously transmit a packet, the second terminal requests CA in the data transmission segment 1113 of the first data frame 1110. That is, the CA-requesting terminal sends a request for continuous resource allocation through the data transmission segment 1113. The request message may contain the continuous occupation period of the data transmission segment, and the period 1160 may be indicated by the number of data frames.

Afterwards, the receiving terminal that has transmitted an ACK signal for the data transmission segment 1113 of the first data frame 1110 in the DS_RSP segment 1122 of the second data frame 1120 continuously allocates resources is aware that PA has been requested, and allocates resources, starting from the data transmission segment 1133 of the third data frame 1130. That is, if there is no request for an allocation type with higher priority than CA while the data transmission segment is being used for CA, the data transmission segment continues to be allocated to the second terminal.

Figure 12:
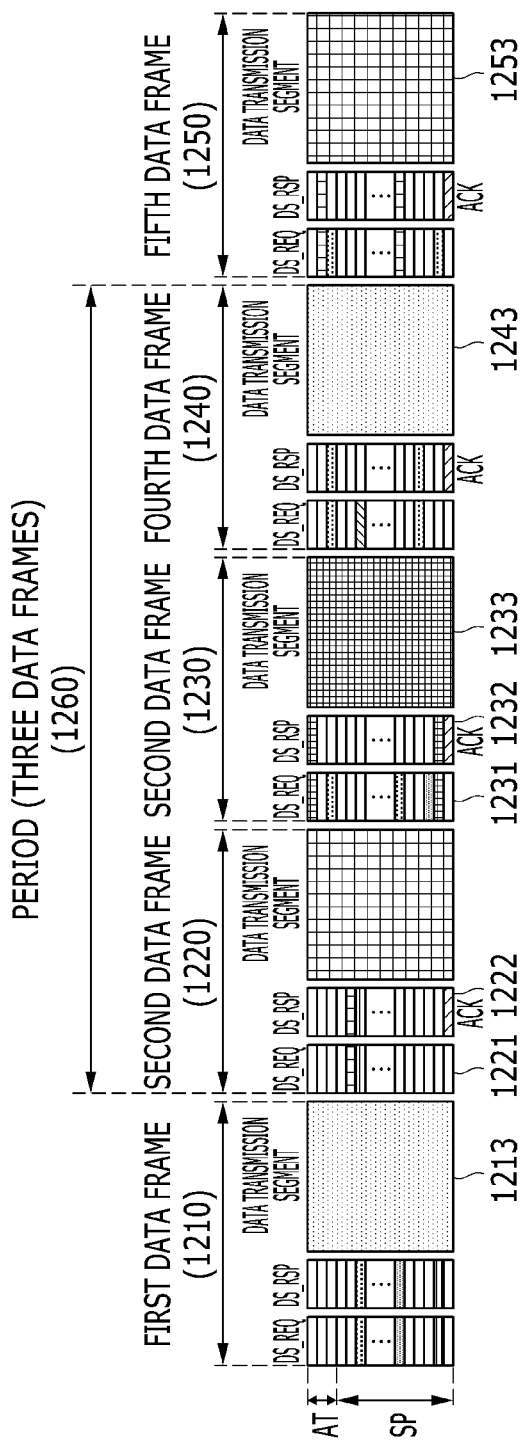
FIG. 12 is a time-sequence diagram showing data frames for mixed allocation according to an exemplary embodiment of the present invention.

FIG. 12 is a time-sequence diagram showing data frames for mixed allocation according to an exemplary embodiment of the present invention.

Referring to FIG. 12, the second terminal that has used the data transmission segment according to the general allocation method requests CA in the data transmission segment 1213 of the first data frame 1210 if necessary, and receives an ACK signal in the DS_RSP 1222 of the second data frame 1220. However, because the first terminal has requested PA in the data transmission segment of the second data frame, the first terminal uses the data transmission period 1253 of the data frame (fifth data frame) 1250 of the next period 1260. In addition, because BA has been requested in the DS_REQ 1231 of the third data frame 1230, the data transmission segment 1233 of the third data frame 1230 may be allocated to the base station. Also, the data transmission period 1243 of the other data frame (fourth data frame) 1240 may be used by the second terminal.

In another exemplary embodiment of the present invention, it is assumed that 112 link identifiers are included in an TDC network. The link identifiers are numbered from 0 to 111.

Figure 13:
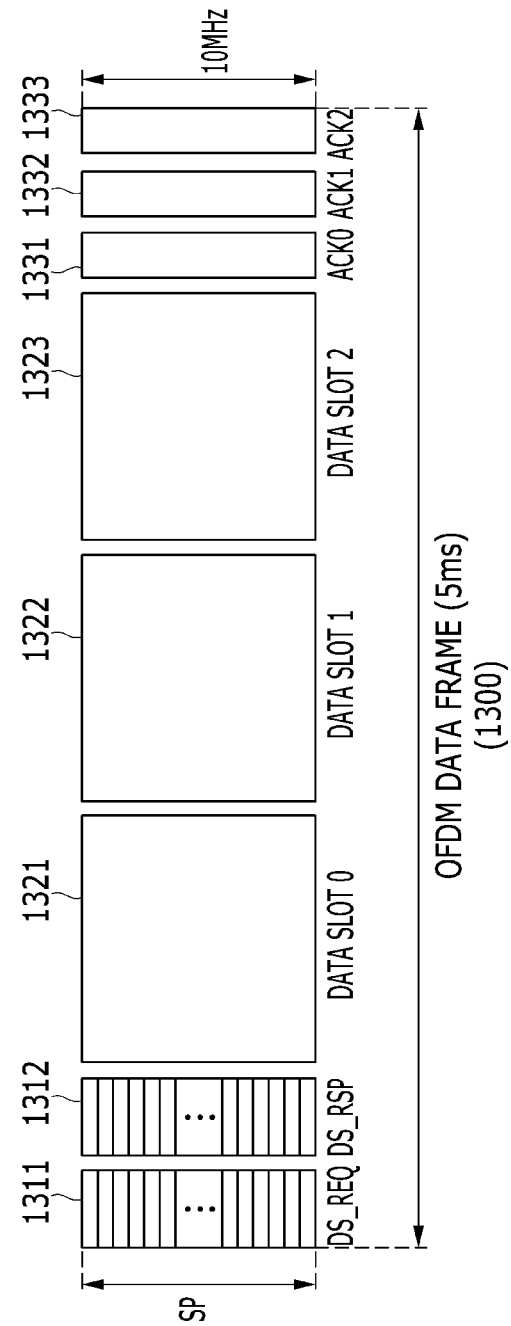
FIG. 13 is a view showing an OFDM data frame according to another exemplary embodiment of the present invention.

FIG. 13 is a view showing an OFDM data frame according to another exemplary embodiment of the present invention.

Referring to FIG. 13, the duration of an OFDM data frame 1300 according to an exemplary embodiment of the present invention is 5 ms, and its bandwidth is 10 MHz. The bandwidth of 10 MHz is divided into the number (112 in the exemplary embodiment of the present invention) of link identifiers, and one SP is assigned to each of the divided parts. One of the multiple SPs is assigned for each link, and the frequency for each SP is orthogonal.

When pluralities of terminals transmit signals (or SPs) by using the resources corresponding to the SPs in the DS_REQ segment 1311 of the OFDM data frame 1300, the order of use of data slots is determined according to the priority of the transmitted signals. In this case, the OFDM data frame 1300 includes three data slots 1321, 1322, and 1323.

For example, when signals are transmitted in the 2nd SP, 50th SP, 73rd SP, and 111st SP of the DS_REQ segment 1311 of the first OFDM data frame 1300, the terminals corresponding to the 2nd SP, 50th SP, and 73rd SP can transmit data using the data slots, whereas the terminal corresponding to the 111st SP cannot transmit a signal using the first OFDM data frame 1300. Specifically, the terminal corresponding to the 2nd SP can transmit a signal using the 0th data slot 1321, the terminal corresponding to the 50th SP can transmit a signal using the first data slot 1322, and the terminal corresponding to the 73rd SP can transmit a signal using the second data slot 1323.

ACK signals for the data slots are transmitted and received over an ACK channel included in the OFDM data frame 1300. In the OFDM data frame 1300 according to an exemplary embodiment of the present invention, the ACK channel includes three ACK slots 1331, 1332, and 1333 corresponding one-to-one to the data slots, and ACK signals are transmitted and received in the respective ACK slots.

Figure 14:
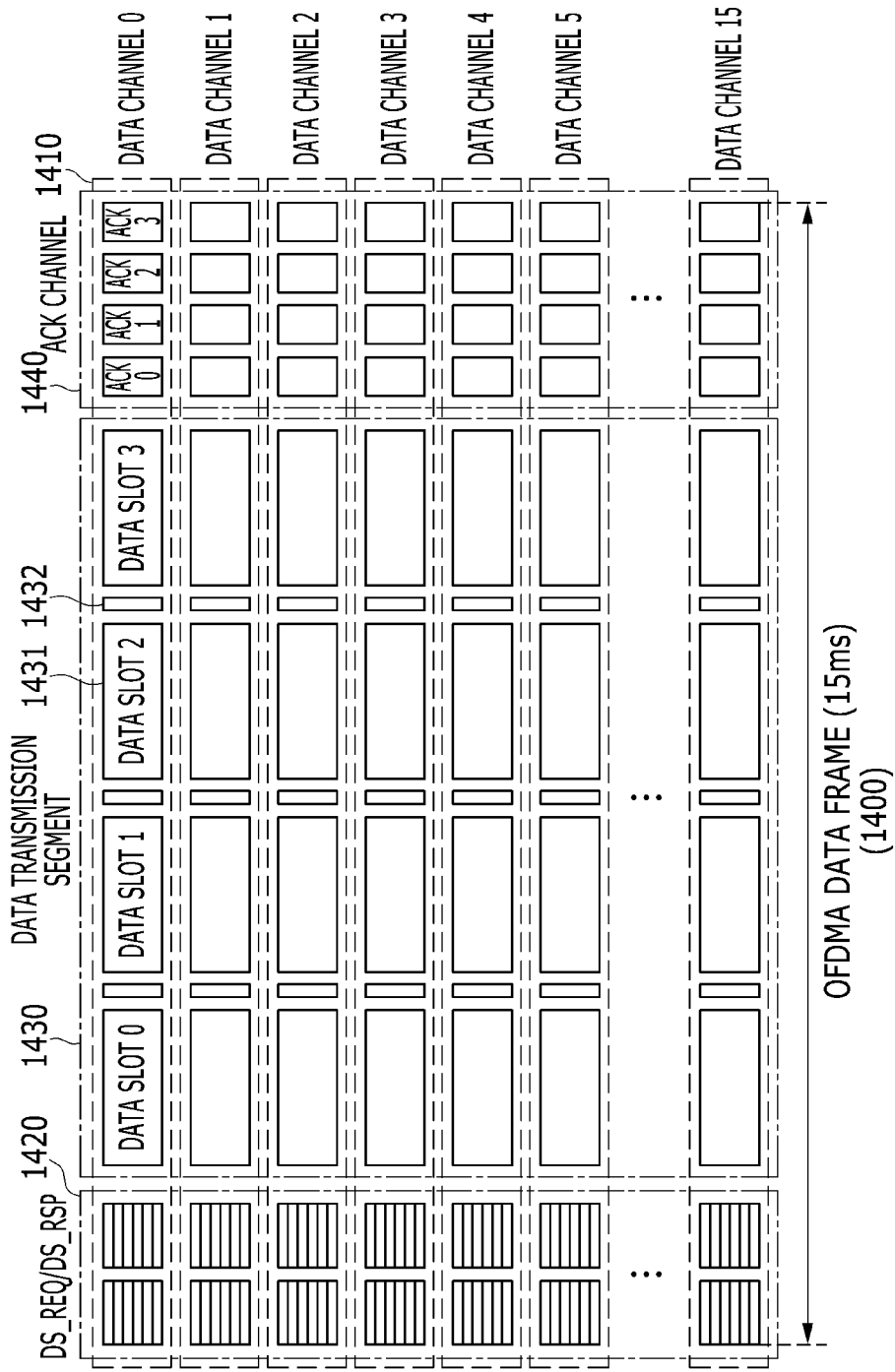
FIG. 14 is a view showing an OFDMA data frame according to another exemplary embodiment of the present invention.

FIG. 14 is a view showing an OFDMA data frame according to another exemplary embodiment of the present invention.

Referring to FIG. 14, in an OFDMA data frame 1400, frequency resources are divided into a plurality of data channels 1410. The OFDMA data frame according to an exemplary embodiment of the present invention includes a DS_REQ and DS_RSP segment 1420, a data transmission resource 1430, and an ACK channel 1440 including a plurality of ACK slots corresponding one-to-one to data slots 1431 included in a data transmission resource 1430, and a transmission indicator (TI) 1432 is inserted between the data slots 1431.

In an exemplary embodiment of the present invention, the OFDMA data frame 1400 may include 16 data channels 1410, and the duration of the OFDMA data frame 1400 may be 15 ms or 20 ms. In the 15 ms OFDMA data frame, each data channel may include four data slots. In the 20 ms OFDMA data frame, each data channel may include six data slots. In the exemplary embodiment below, the present invention will be described with respect to the 15 ms OFDMA data frame.

Figure 15:
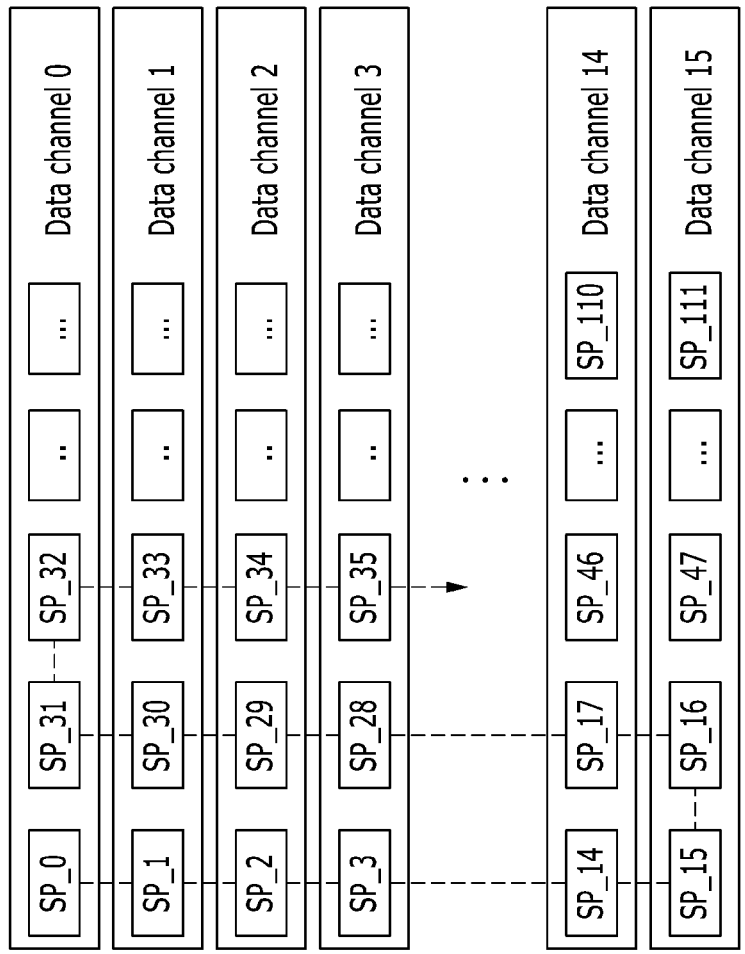
FIG. 15 is a view showing data channels in order of scheduling priority according to another exemplary embodiment of the present invention.

FIG. 15 is a view showing data channels in order of scheduling priority according to another exemplary embodiment of the present invention.

A terminal according to an exemplary embodiment of the present invention can determine data channels to be used according to SP. That is, when a terminal determines SP according to Equation 1, a data channel to be used by the terminal is determined from among a plurality of (16 for a 15 ms OFDMA data frame) data channels included in an OFDMA data frame. For example, as shown in FIG. 15, SPs are aligned in a zigzag manner for 16 data channels so that 0th, 31st, 32nd, 63rd, 64th, 95th, and 96th SPs can be allocated for the 0th data channel and the 15th, 16th, 47th, 48th, 79th, 80th, and 111st SPs can be allocated for the 15th data channel. Also, in the exemplary embodiment of the present invention, since there are all of 112 links included in a direct communication network, seven terminals can request data transmission resources in the DS_REQ segment over each data channel, without collisions.

Figure 16:
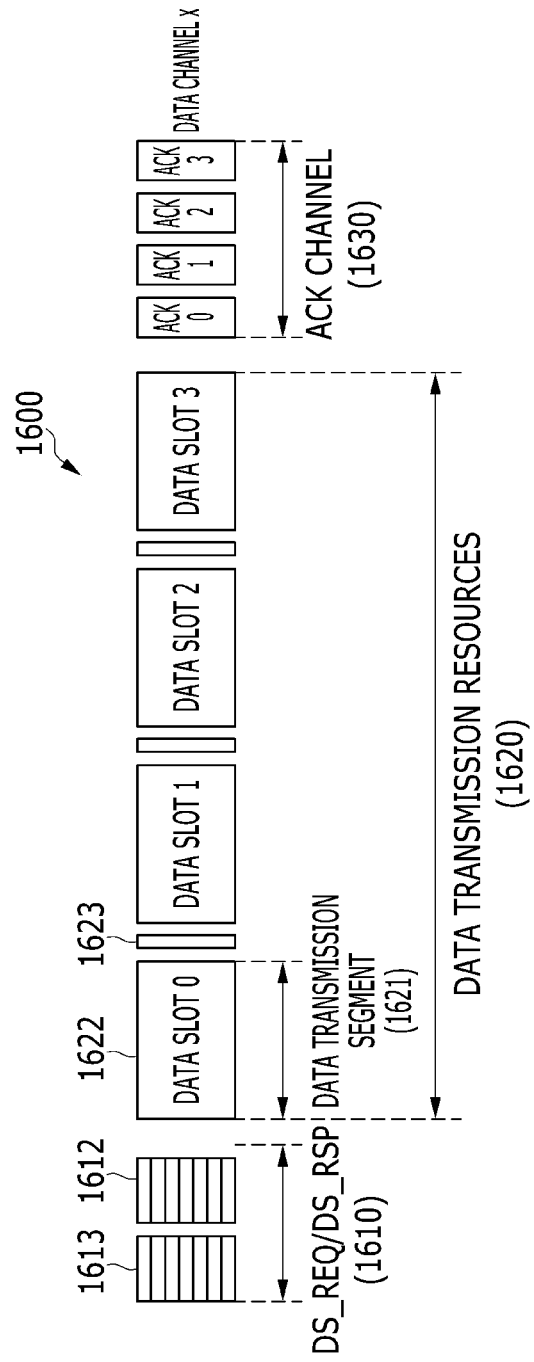
FIG. 16 is a view showing an OFDMA data frame according to another exemplary embodiment of the present invention.

FIG. 16 is a view showing an OFDMA data frame according to another exemplary embodiment of the present invention.

Referring to FIG. 16, some of the seven terminals allocated for an x-th data channel requests resources in a DS_REQ segment 1611 and receives a response in a DS_RSP segment 1612, and then transmits data using a data slot 1622. The terminals that have transmitted the data broadcasts their SP by using a TI segment 1623. After data has been transmitted in the last data slot included in the data transmission resources, the terminal that has received the data transmits ACK signals to the terminals that have transmitted the data in the order of data transmission, by using an ACK channel 1630. For example, when three of the seven terminals request resources in the DS_REQ segment 1611, the 0th terminal having the highest SP transmits data using the 0th data slot, and then broadcasts its SP in the subsequent TI segment. Afterwards, the 1st terminal having the second highest priority transmits data using the 1st data slot and then broadcasts its SP in the subsequent TI segment. Subsequently, the 2nd terminal having the lowest SP transmits data using the 2nd data slot. That is, a terminal can use the subsequent data slot after all the terminals having higher priority have transmitted data.

Following the 3rd data slot, each terminal that has received data transmitted from the 1st to 3rd terminals transmits ACK signals to the 0th, 1st, and 2nd terminals over the ACK channel 1630.

Figure 17:
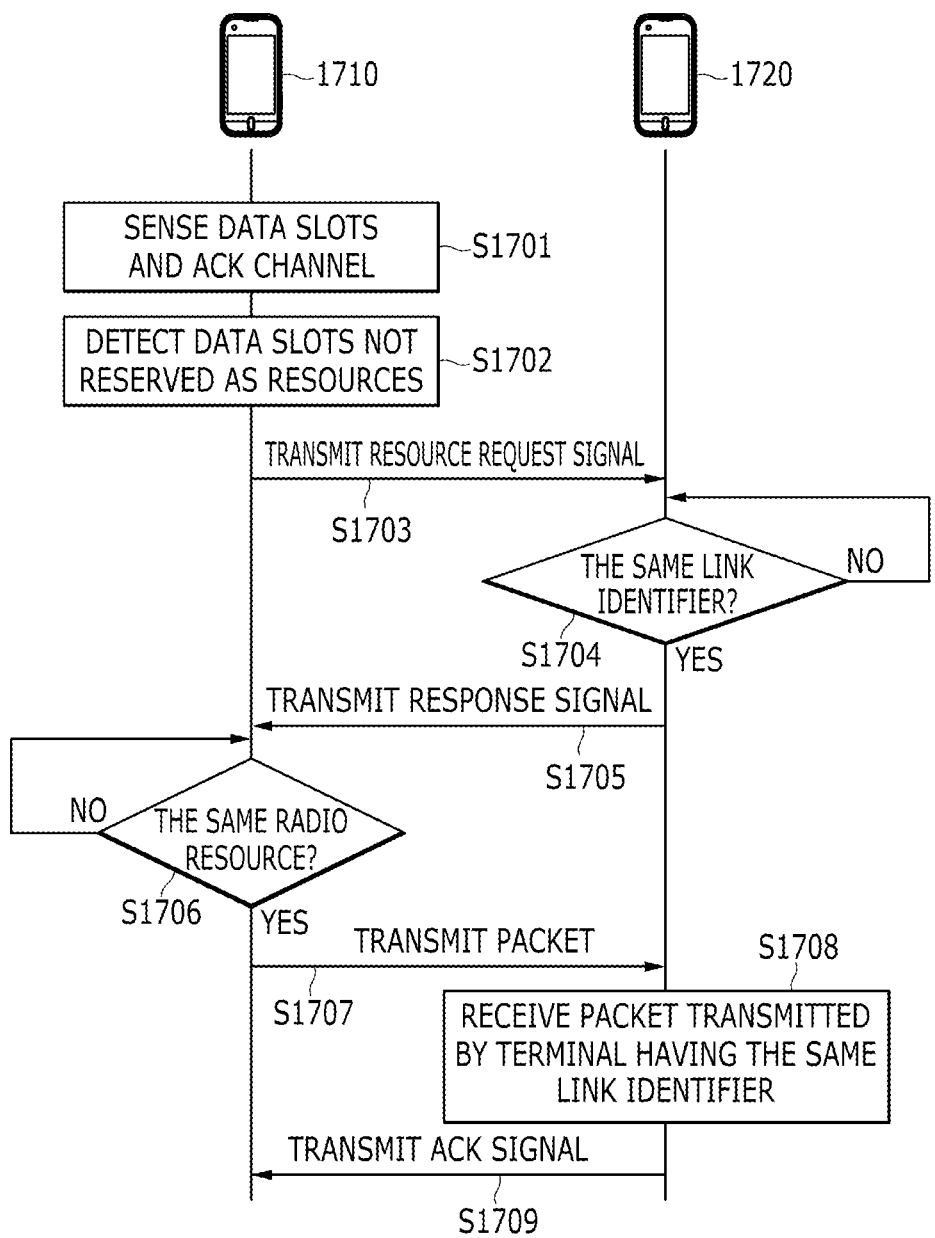
FIG. 17 is a flowchart showing a distributed resource allocation process according to another exemplary embodiment of the present invention.

FIG. 17 is a flowchart showing a distributed resource allocation process according to another exemplary embodiment of the present invention.

Referring to FIG. 17, first of all, a terminal continuously senses data slots and an ACK channel (S1701). Next, when data to be transmitted is generated, data slots not reserved as resources are detected (S1702), and data slots for which resources are reserved are not used. In the exemplary embodiment of the present invention, the reservation of resources refers to the allocation of a specific terminal to a data channel by PA or CA. In the exemplary embodiment of the present invention, each terminal can decide whether resources are reserved for a data channel or not by identifying the pattern of a preamble positioned at the beginning portion of a data slot or recognizing the identifier (e.g., specific code, specific field, or resource reservation type field) of an ACK channel.

Afterwards, a data transmitting terminal transmits a resource request signal in the DS_REQ segment by using the radio resource corresponding to its SP (S1703). Then, a data receiving terminal (a terminal in the receiving mode) receives the signal in the DS_REQ segment. In this case, the data receiving terminal checks whether this signal is transmitted from a terminal having the same link identifier (corresponding to its SP) (S1704), and if this received signal is transmitted from a terminal having the same link identifier, it broadcasts a response signal in the DS_RSP segment by using the radio resource corresponding to its SP (S1705).

Afterwards, the transmitting terminal receives all the signals in the DS_RSP segment, and upon receiving a response signal transmitted using the radio resource corresponding to its SP (S1706), transmits a packet using a data slot according to its priority (S1707). That is, the transmitting terminal analyzes the SPs of all response signals in the DS_RSP segment, and upon deciding that it has the highest priority among the plurality of terminals that have requested resources in the DS_REQ segment, transmits a packet in the 0th data slot. However, if there exists a terminal having higher priority, the transmitting terminal waits until it becomes aware of the completion of packet transmission of this terminal through a TI signal. Upon being aware of the completion of packet transmission of all the terminals having higher priority through a TI signal, the terminal transmits its packet using the subsequent data slot.

Having transmitted a response signal in the DS_RSP segment, the receiving terminal receives the signal fields of data slots and identifies a data slot used by a terminal having the same link identifier, and then receives the packet transmitted in this data slot (S1708).

In the exemplary embodiment of the present invention, the transmitting terminal and the receiving terminal may transmit a TI signal corresponding to their priority by using the TI segment that appears immediately next to a specific data slot. In the 15 ms OFDMA data frame, seven links are included in one data channel, and therefore the priority transmitted by the transmitting terminal and the receiving terminal may range from 0 to 6.

Following all the data slots included in one data channel, the receiving terminal transmits an ACK signal by using the ACK slot corresponding to the data slot received over the ACK channel (S1709). That is, if a specific receiving terminal receives a packet in the 0th data slot, it transmits an ACK signal through the 0th ACK slot, or if the specific receiving terminal receives a packet in the 2nd data slot, it transmits an ACK signal through the 2nd ACK slot.

Figure 18:
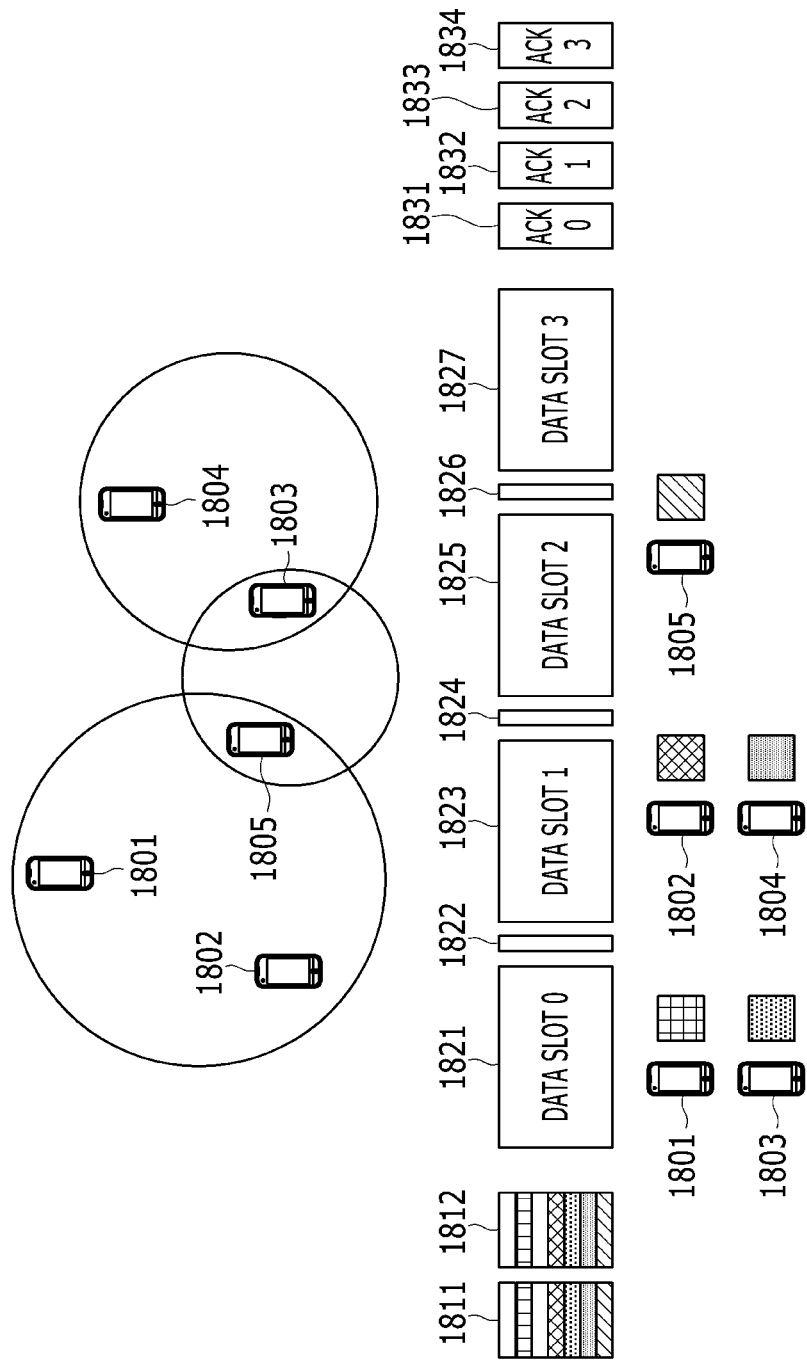
FIG. 18 is a view showing a direct communication network and a data frame according to another exemplary embodiment of the present invention.

FIG. 18 is a view showing a direct communication network and a data frame according to another exemplary embodiment of the present invention.

Referring to FIG. 18, of the terminals included in the direct communication network, terminal A 1801, terminal B 1802, and terminal E 1805 form a network, terminal C 1803 and terminal D 1804 form a network, and terminal C 1803 and terminal E 1805 form a network. In this case, no interference occurs between the networks. That is, terminals A, B, and E 1801, 1802, and 1805 may transmit and receive signals to and from each other, and terminals C and D 1803 and 1804 may transmit and receive signals to and from each other; however, the signal transmission/reception coverage of terminals C and D 1803 and 1804 does not overlap with the signal transmission/reception coverage of terminals A and B 1801 and 1802. Terminal E 1805 may transmit and receive signals to and from terminal A 1801 and terminal B 1802 and also to and from terminal C 1802.

In the network of FIG. 18, each terminal requests resources according to calculated SPs by using a DS_REQ segment 1810. It is assumed that the priority of terminals in FIG. 18 is in the order of terminal A>terminal B>terminal C>terminal D>terminal E.

Next, each terminal receives a response from a receiving terminal in a DS_RSP segment 1812, and transmits a packet using data slots 1821, 1823, 1825, and 1827.

Although terminal B 1802 has higher priority than terminal C 1803, the signal transmission coverage of terminal B 1802 overlaps with the signal transmission coverage of terminal A 1801 and the signal transmission coverage of terminal C 1803 does not overlap with the signal transmission coverage of terminal A 1801. Thus, terminal C 1803 can transmit a packet using the same data slot ($0^{th}$ data slot) as terminal A 1801. Afterwards, terminal A 1801 and terminal C 1803 transmit priority signals corresponding to their priority in the subsequent TI segment 1822.

On the other hands, terminal B 1802 receives the priority signal from terminal A 1801 in the TI segment 1822 and terminal D 1804 receives the priority signal from terminal C 1803 in the TI segment 1822. Thus, terminal B 1802 and terminal D 1804 transmit a packet using the 1st data slot 1823. Thereafter, terminal B 1802 and terminal D 1804 transmit priority signals corresponding to their priority in the subsequent TI segment 1824.

Terminal E 1805 receives the priority signal from terminal A 1801 in the first TI segment 1822 and the priority signals from terminal B 1802 and terminal D 1804 in the second TI segment 1824. Subsequently, terminal E 1805 receives all of the priority signals from the terminals having higher priority than itself, and therefore transmits a packet in the 2nd data slot.

Figure 19:
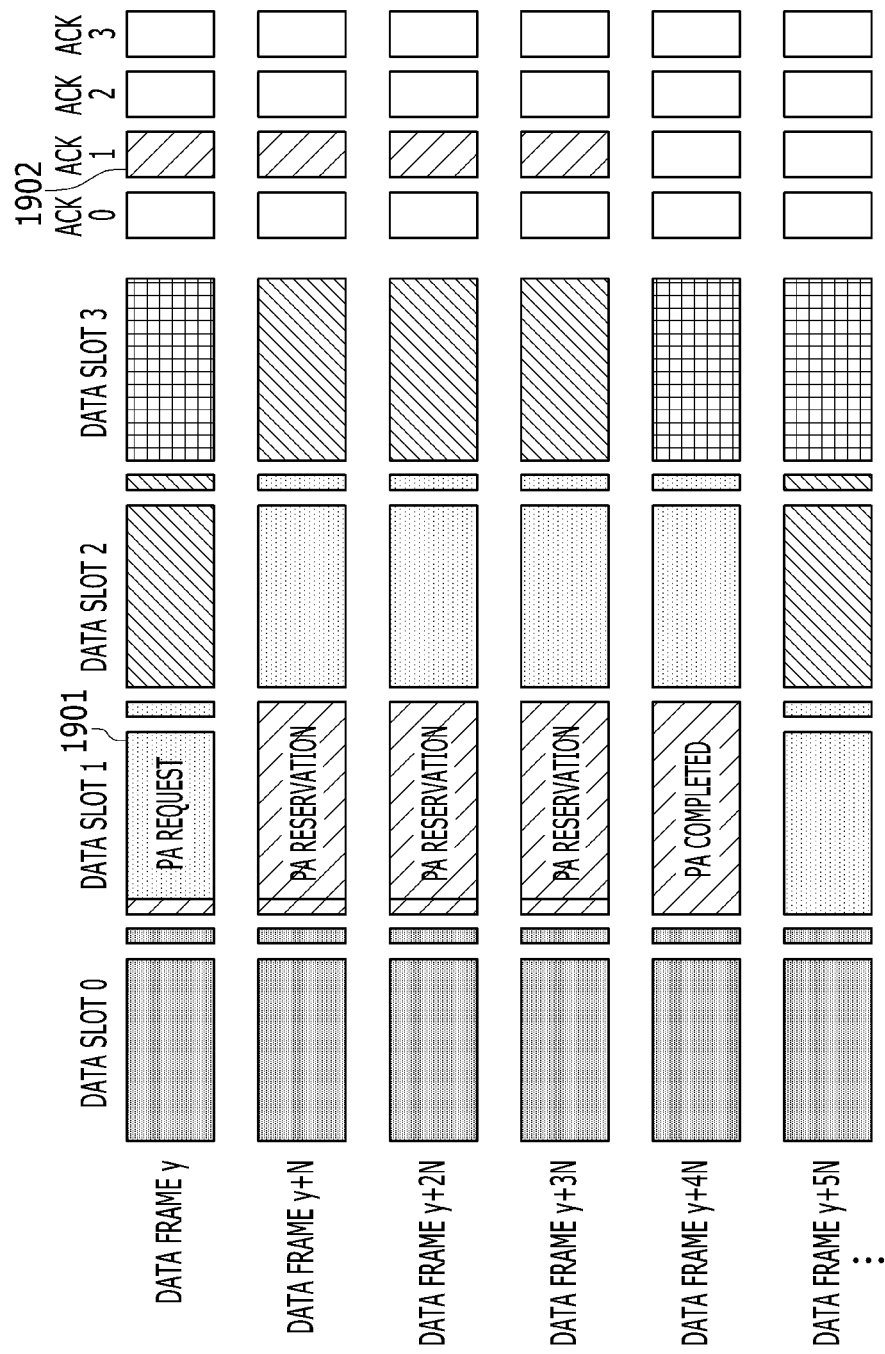
FIG. 19 is a view showing a method of periodically allocating data frames according to another exemplary embodiment of the present invention.

FIG. 19 is a view showing a method of periodically allocating data frames according to another exemplary embodiment of the present invention. All the data frames shown in FIG. 19 correspond to a data channel x, and DS_REQ/DS_RSP segments are omitted.

Referring to FIG. 19, in an exemplary embodiment of the present invention, data slots in which a packet is to be transmitted to four terminals through DS_REQ/DS_RSP of a y-th data frame are determined. Afterwards, of the four terminals, a transmitting terminal (hereinafter, referred to as a 'PA terminal') for which a 1st data slot 1901 is allocated changes the type of the preamble of the 1st data slot to reservation type, and transmits a PA request message in the 1st data slot. Having received the PA request message, the receiving terminal indicates the reservation type by an identifier corresponding to PA, and transmits an ACK signal in an ACK slot 1902 for the 1st data slot. In the exemplary embodiment of the present invention, the identifier corresponding to PA may be "01", and the period of PA requested by the PA terminal may be set in units of data frames.

Afterwards, the 1st data slot of a (y+N)th data frame, a (y+2N)th data frame, or a (y+3N)th data frame becomes a data slot reserved for PA. In this case, the PA terminal transmits the preamble of the data slot reserved for PA as the reservation type, and transmits data by using the data slot reserved for PA. The receiving terminal indicates the reservation type by "01", and transmits an ACK signal in an ACK slot for the data slot reserved for PA.

Afterwards, if the preamble of the data slot reserved for PA is transmitted as normal type or no signal is transmitted in the data slot reserved for PA, as shown in the 1st data slot of a (y+4N)th data frame, this means that the reservation of a PA resource is canceled. Hence, the receiving terminal switches the reservation type back to normal type. In the exemplary embodiment of the present invention, the identifier indicating normal type as the reservation type may be "00".

Figure 20:
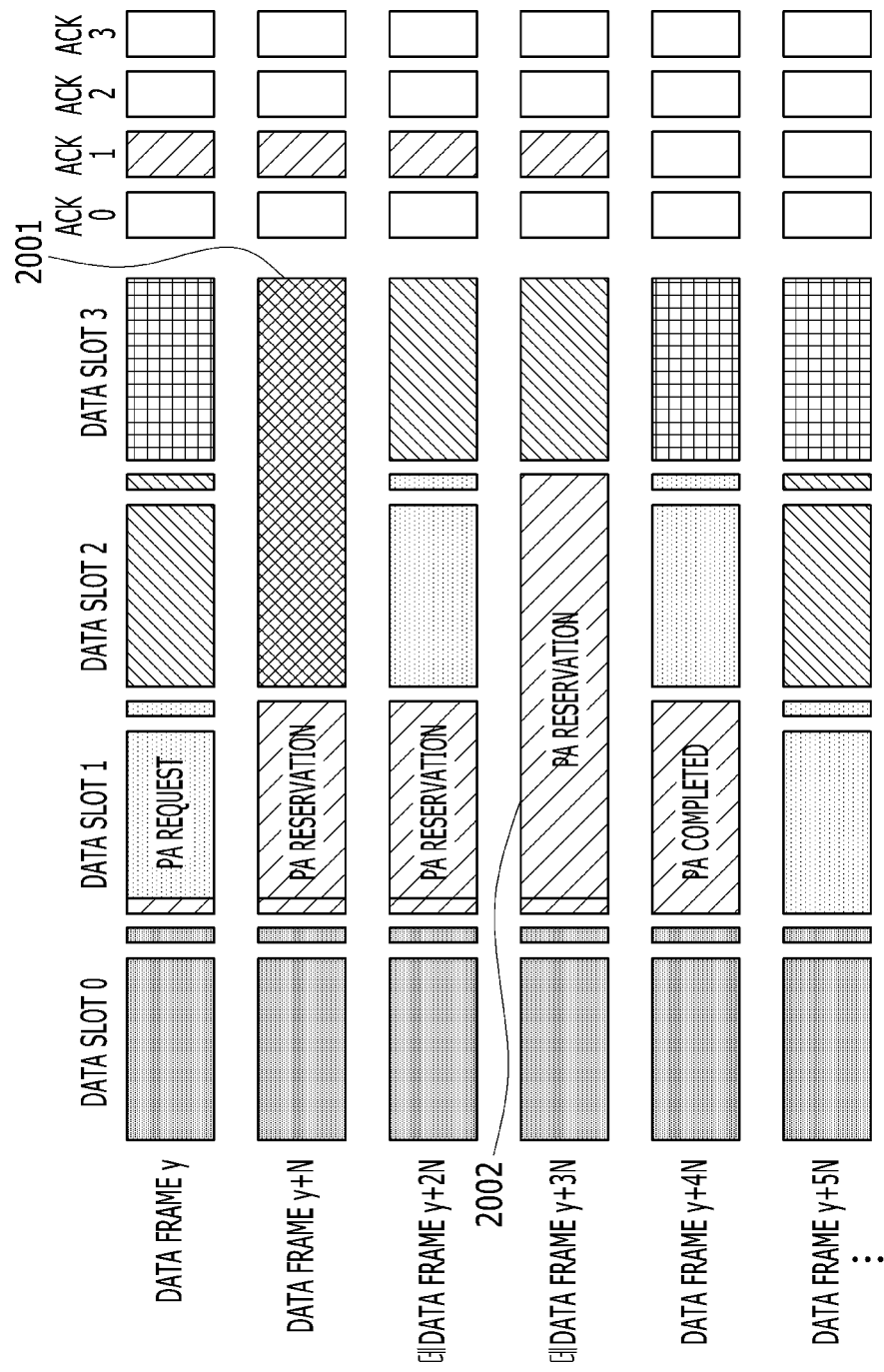
FIG. 20 and FIG. 21 are views showing a method of continuously allocating data frames according to another exemplary embodiment of the present invention.
Figure 21:
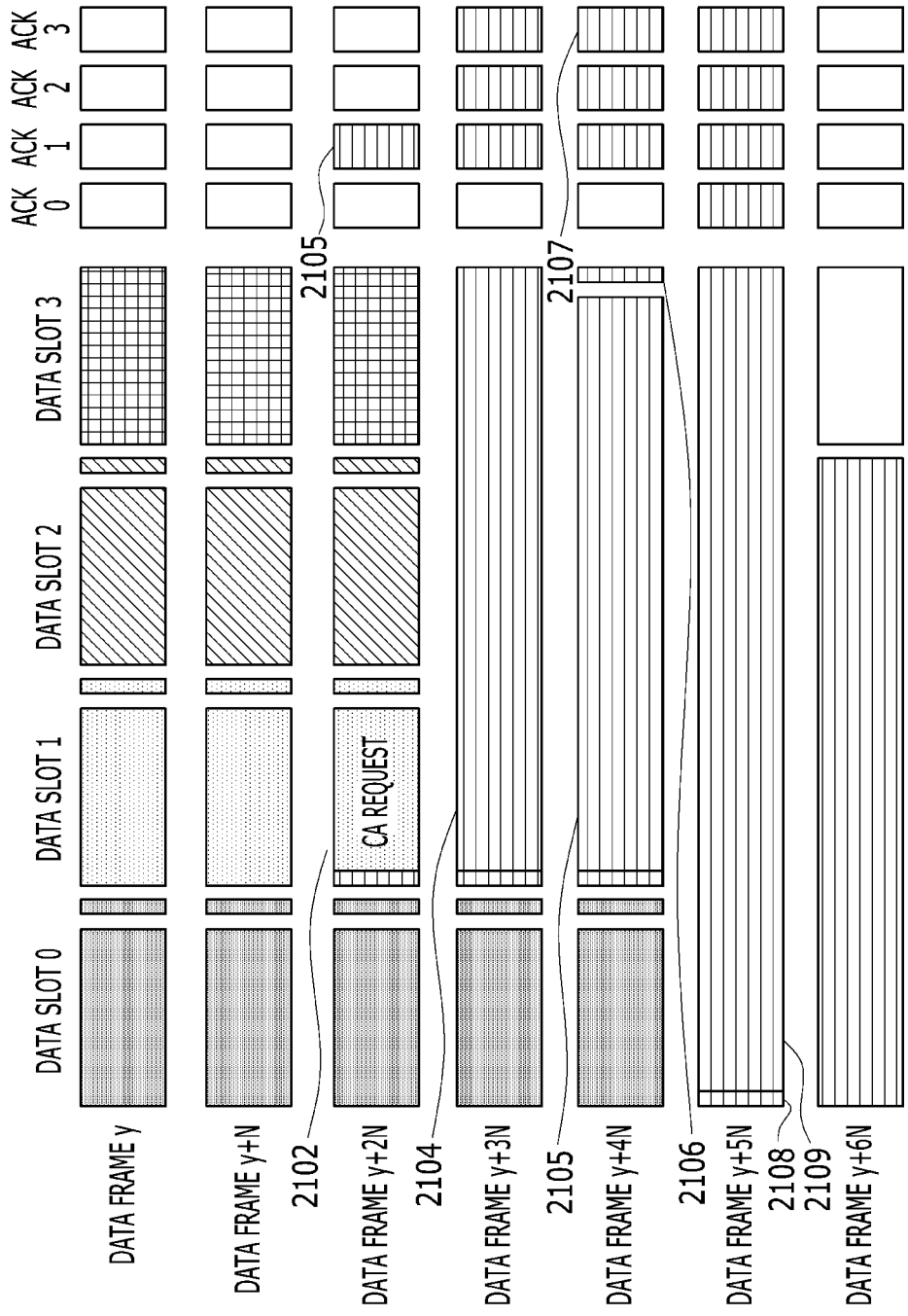

FIG. 20 and FIG. 21 are views showing a method of continuously allocating data frames according to another exemplary embodiment of the present invention.

If one data slot is insufficient while a specific terminal is transmitting a packet by general allocation, the terminal may continuously use other data slots included in the data frame.

For example, it is assumed that, in the network of FIG. 18, terminal A 1801 and terminal D 1804 use two or three data slots in order to transmit a packet. Terminal A 1801 can use the 0th data slot 1821 according to its priority. Subsequently, terminal A 1801 can use the 1st data slot 1823 and the 2th data slot 1825 by consecutively creating data symbols without TI segments. While terminal B 1802 cannot use the 1st data slot 1823 because it does not receive a valid signal indicating a priority in the TI segment 1822, terminal A 1801 can transmit a packet by consecutively using the 0th to 2nd data slots 1821 to 1825.

Afterwards, when terminal A 1801 transmits a signal including the priority "1" in the TI subsequent 1826 subsequent to the 2nd data slot 1825, terminal B 1802, having received this signal, becomes aware that terminal A 1801 has completed the use of data slots and transmits a packet using the 3rd data slot 1827.

Terminal C 1803 also uses the 0th data slot 1821. When terminal C 1803 transmits a signal including the priority of terminal C 1803 in the TI segment 1822 subsequent to the 0th data slot 1821, terminal D 1804 becomes aware that terminal C 1803 has completed the use of data slots and transmits a packet using the 1th data slot 1823. If terminal D 1804 has to use two data slots, terminal D 1804 may use the 1st data slot 1823 and the 2th data slot 1825 by consecutively creating data symbols without TI segments.

In this case, terminal E 1805 receives a signal including the priority of terminal D 1804 in the TI segment 1826 subsequent to the 2nd data slot 1825, but does not receive a signal including the priority of terminal B 1802. Thus, terminal E 1805 cannot use data slots until the data frame ends.

Referring to FIG. 20, the 2nd and 3rd data slots 2001 of the (y+N)th data frame are consecutively used without a TI segment between them. Once data slots are continuously allocated, variable rate PA is enabled.

If a data slot needs to be used subsequently to a data slot reserved for PA in a frame having resources reserved for PA, because packet retransmission is required or an additional packet is generated, CA may be used. In this case, the subsequent data slot must not collide with other data slots reserved for CA or PA. The $2^{nd}$ data slot 2002 included in the (y+3N) data frame is used as a CA data slot by the terminal that has used the $1^{st}$ data slot as the data slot reserved for PA. The reservation type of an ACK slot for the CA data slot is also "01".

Referring to FIG. 21, a CA requesting terminal (hereinafter, referred to as a 'CA terminal') transmits the preamble 2101 of a data slot as the reservation type, and the receiving terminal broadcasts the reservation type of an ACK slot 2103 for this data slot 2102 by an identifier corresponding to CA. In the exemplary embodiment of the present invention, the identifier corresponding to CA as the reservation type is "10".

Every terminal that has received an ACK signal indicating the reservation type by the identifier corresponding to CA thereafter becomes aware that data slots ranging from a data slot reserved for CA to the last data slot of the data frame are reserved for CA. That is, referring to FIG. 21, because CA is requested in the 1st data slot 2102 of the (y+2N)th data frame and the receiving terminal accepts the CA request, the 1st to 3rd data slots 2104 of the (y+3N)th data frame are reserved as CA data slots.

Meanwhile, if the CA requesting terminal wants to use all data slots included in a data frame, it notifies other terminals about the reservation of all the data slots through the TI segment 2106 subsequent to the last data slot 2105 used for CA. Then, the receiving terminal broadcasts the reservation type of an ACK slot 2107 by an identifier corresponding to CA extension. In the exemplary embodiment of the present invention, the identifier corresponding to CA extension is "11". Referring to FIG. 21, because CA extension is requested in the TI segment 2106 subsequent to the last data slot 2105 of the (y+4N)th data frame and the receiving terminal accepts the CA extension request through the last ACK slot 2107, all the data slots of the (y+5N)th data frame are allocated to the CA terminal. The CA terminal may transmit the preamble of the 0th data slot 2108 of the (y+5N)th data frame to indicate the reservation type, and transmit a packet using the 0th to 3rd data slots 2109.

Afterwards, if the CA terminal transmits a preamble for normal type or transmits no packets in data slots, the receiving terminal switches the reservation type for the ACK slots back to "00" and broadcasts it. Referring to FIG. 21, because three data slots are initially reserved for CA, the 0th to 2th data slots 2110 are allocated for the CA terminal even after the CA reservation is completed.

In the event of collision between CA resource reservation and PA resource reservation, PA is chosen because PA has higher priority than CA. That is, the CA terminal may consecutively use the data slots other than the data slot reserved for PA.

Table 1 shows how QoS support works in the distributed resource allocation method of the present invention.

TABLE 1

| Class | Delay | Jitter | Data rate | Applications | Scheduling Policy | | |
|---|---|---|---|---|---|---|---|
| | | | | | Resource reservation | Priority scheduling | Multiple channel access |
| Class1 | Medium | Low | Low | (periodic, constant)VoIP | Periodic Allocation(PA) | No | No |
| Class2 | Medium | Low | Variable | (periodic, variable)video streaming | Periodic Allocation(PA) | No | Yes |
| Class3 | — | — | Medium, high | (non periodic, bulk)File transfer | Continuous Allocation(PA) | No | Yes |
| Class4 | Medium, high | — | — | (non-periodic, delay bound) chatting, gaming | No | High Scheduling priority | No |
| Class5 | — | — | — | (background) SMS, MMS | No | No | No |

Referring to Tale 1, services corresponding to class 1 and class 2 are sensitive to packet transmission delay, and periodically generate packets. Accordingly, PA or variable PA resource allocation is applied to classes 1 and 2 to meet the QoS for these services.

On the other hand, CA resource allocation is applied to class 3 because class 3 requires high data rates, as is needed for large file transfer. Although class 4 has the requirement for packet transmission delay, it may be given high scheduling priority for service provision because packets are generated non-periodically or in a bursty fashion.

At least some functions of the above-described data transmitting/receiving apparatus and method according to an exemplary embodiment of the present invention can be implemented in hardware or in software connected to hardware.

According to an embodiment of the present invention, the reliability of talk-around direct communication (TDC) can be increased by avoiding collisions of messages transmitted from a terminal included in an TDC network. In addition, various types of QoS can be guaranteed in a distributed TDC network by providing various types of resource reservation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A method in which a transmitting terminal included in a direct communication (TDC) network transmits data, the method comprising:
   determining a data frame for transmitting the data, the data frame including a transmission request segment, a transmission response segment and a data transmission segment;

requesting a receiving terminal to reserve the data transmission segment through the transmission request segment;
receiving, from the receiving terminal, a response signal transmitted in the transmission response segment; and
analyzing the response signal and transmitting the data through the data transmission segment, wherein
the transmission request segment and the transmission response segment each include a scheduling code that identifies a scheduling priority (SP) and an allocation type of a link between the transmitting and receiving terminals.

2. The method of claim 1, further comprising, prior to the determining;
transmitting a link setup request message; and
receiving a link setup response message in response to the link setup request message and acquiring a link identifier.

3. The method of claim 1, wherein the determining comprises:
determining the data frame according to orthogonal frequency division multiplexing (OFDM), wherein
the data frame comprises an ACK channel for transmitting and receiving an ACK signal of the data transmitted in the data transmission segment, and the data transmission segment comprises a plurality of data slots.

4. The method of claim 1, wherein the determining comprises:
determining one of a plurality of data channels included in data channels according to orthogonal frequency division multiple access (OFDMA), wherein
the data frame comprises an ACK channel for transmitting and receiving an ACK signal of the data transmitted in the data transmission segment, and
the data transmission segment comprises a plurality of data slots.

5. The method of claim 4, wherein the determining the one data channel comprises:
calculating a SP of the transmitting terminal based on a function of a transmitting terminal identifier, an TDC link identifier, a time index, a data QoS (quality of service) index, and a resource load index; and
selecting the one data channel including the SP of the transmitting terminal from among the plurality of data channels.

6. The method of claim 5, wherein the requesting comprises:
transmitting a resource request signal by using a radio resource corresponding to the SP of the transmitting terminal among radio resources included in the transmission request segment.

7. The method of claim 6, wherein the transmitting comprises:
analyzing a SP corresponding to at least one radio resource through which the response signal is received, and determining the SP of the transmitting terminal; and
transmitting the data by using a first data slot corresponding to determined priorities of the plurality of data slots.

8. The method of claim 7, wherein the transmitting further comprises:
upon completion of the data transmission, broadcasting a transmission indicator signal through a transmission indicator segment subsequent to the first data slot, by using the radio resource corresponding to the SP of the transmitting terminal.

9. The method of claim 8, further comprising, after transmitting, receiving the ACK signal in a first ACK slot corresponding to the first data slot, among the plurality of ACK slots included in the ACK channel.

10. The method of claim 9, wherein
the transmitting further comprises:
transmitting a preamble for a reservation type in the first data slot; and
transmitting, in the first data slot, a periodic allocation (PA) request message requesting to periodically reserve data slots, and
the receiving of the ACK signal comprises:
receiving, in the first ACK slot, a PA ACK signal indicating the reservation type by an identifier corresponding to PA, and
after receiving the PA ACK signal, using a first data slot included in the next data frame as a data slot reserved for the PA.

11. The method of claim 9, wherein
the transmitting further comprises:
transmitting a preamble for a reservation type in the first data slot; and
transmitting, in the first data slot, a continuous allocation (CA) request message requesting to continuously reserve data slots, and
the receiving of the ACK signal comprises:
receiving, in the first ACK slot, a CA ACK signal indicating the reservation type by an identifier corresponding to CA, and
after receiving the CA ACK signal, using first to last data slots included in the second data frame next to the current data frame as data slots reserved for the CA.

12. The method of claim 11, further comprising, after using the first to last data slots included in the second data frame subsequent to the current data frame as data slots reserved for the CA, when continuously reserving all data slots included in a third data frame subsequent to the second data frame, broadcasting a transmission indicator signal by using the radio resource corresponding to the SP of the transmitting terminal, after using the last data slot of the second data frame.

13. A method in which a receiving terminal included in a direct communication (TDC) network receives data, the method comprising:
receiving a request signal from a transmitting terminal, the request signal requesting to reserve a data transmission segment included in a data frame through a transmission request segment included in the data frame;
broadcasting a response signal transmitted in a transmission response segment included in the data frame;
receiving signal fields of a plurality of data slots included in the data transmission segment and identifying a data slot used by a terminal having the same link identifier, among the plurality of data slots; and
receiving the data in the identified data slot, wherein
the transmission request segment and the transmission response segment each include a scheduling code that identifies a scheduling priority (SP) and an allocation type of a link between the transmitting and receiving terminals.

14. A method in which a receiving terminal included in a direct communication (TDC) network receives data, the method comprising:
receiving, through a transmission request segment included in a data frame, a request signal requesting to reserve a data transmission segment included in the data frame from at least one transmitting terminal;
distinguishing the request signal by an allocation type (AT) area and a scheduling priority (SP) area of the transmission request segment and determining a transmitting terminal to transmit a response signal, among the at least one transmitting terminal;

transmitting the response signal to the determined transmitting terminal in a transmission response segment included in the data frame; and receiving the data transmitted in the data transmission segment by the determined transmitting terminal.

15. The method of claim 14, wherein the determining comprises:

determining a priority of the at least one transmitting terminal based on the signal received in the AT area; and determining the highest-priority transmitting terminal, among the at least one transmitting terminal, to transmit the response signal to.

16. The method of claim 15, wherein the transmitting of a response signal comprises:

transmitting the response signal to the determined transmitting terminal by using the radio source used for the determined transmitting terminal.

17. The method of claim 14, wherein the determining comprises:

if there is no signal received in the AT area, determining a priority of the at least one transmitting terminal based on the signal received in the SP area; and determining the highest-priority transmitting terminal, among the at least one transmitting terminal, to transmit the response signal to.

18. The method of claim 17, wherein the transmitting of the response signal comprises:

transmitting the response signal to the terminal that has transmitted the signal in the SP area, by using the radio resource used for the SP area.

19. The method of claim 14, further comprising, after receiving the data, transmitting an ACK signal of the received data by using the radio resource included in the transmission response segment included in the data frame subsequent to the current data frame.

* * * * *